(12) United States Patent
Watson

(10) Patent No.: US 6,857,739 B1
(45) Date of Patent: Feb. 22, 2005

(54) ILLUMINATED EYEWEAR AND A METHOD FOR ILLUMINATING EYEWEAR

(76) Inventor: Peter Watson, 937 McDaniel, Evanston, IL (US) 60202

( * ) Notice: Subject to any disclaimer, the term of this patent is extended or adjusted under 35 U.S.C. 154(b) by 0 days.

(21) Appl. No.: 10/863,711

(22) Filed: Jun. 8, 2004

(51) Int. Cl.$^7$ ................................. G02C 1/00
(52) U.S. Cl. .......................... 351/158; 351/41; 362/103
(58) Field of Search ................. 351/158, 124, 351/41; 362/103

(56) References Cited

U.S. PATENT DOCUMENTS

| | | |
|---|---|---|
| 669,949 A | 3/1901 | Underwood |
| 2,904,670 A | 9/1959 | Calmes |
| 3,060,308 A | 10/1962 | Fortuna |
| 4,254,451 A * | 3/1981 | Cochran, Jr. ................ 362/103 |
| 4,283,127 A | 8/1981 | Rosenwinkel et al. |
| 4,822,160 A | 4/1989 | Tsai |
| 4,822,161 A | 4/1989 | Jimmy |
| 5,594,573 A | 1/1997 | August |
| 5,946,071 A * | 8/1999 | Feldman ....................... 351/41 |
| 6,196,680 B1 | 3/2001 | Novak |

* cited by examiner

Primary Examiner—Hung Xuan Dang
(74) Attorney, Agent, or Firm—Patents + TMS, P.C.

(57) ABSTRACT

Illuminated eyewear and a method for illuminating eyewear are provided. The eyewear may have a bridge which is connected to arms at either side of the bridge. A lens may be connected to the bridge. Positioned between the lens and the bridge may be a light source. Light emitted from the light source may enter the lens and may be projected along an edge of the lens. The light may provide an outline of a shape of the lens, and may also provide a decorative display.

20 Claims, 1 Drawing Sheet

ILLUMINATED EYEWEAR AND A METHOD FOR ILLUMINATING EYEWEAR

BACKGROUND OF THE INVENTION

The present invention generally relates to eyewear having an illuminated lens. A light source connected to the eyewear may project light into the lens. As a result, an edge of the lens may be illuminated. The illumination may project around an edge of the lens and may provide a decorative display for the eyewear.

It is generally known to provide eyewear for various needs of an individual. For example, prescription and/or reading glasses are provided for individuals with impaired vision. The glasses have a bridge which is attached to arms. The bridge rests on a nose of the individual while the arms contact sides of a head of the individual. Lenses are attached to the bridge which allow the individual to focus on, for example, an object. In some glasses, the lenses are tinted.

Another need the individual has is protection from the ultraviolet rays. Sunglasses are generally worn to address this need. Typically, a sunglass frame is similar to that of conventional glasses. Sunglass lenses, however, have a greater degree of tinting to shield the eyes from the ultraviolet rays.

Known eyewear has included various designs to provide a decorative look to the eyewear. For example, eyeglass or sunglass frames have been molded into various shapes, such as, for example, squares, ovals, triangles, figures, or the like. Other known glasses or sunglasses have distinctly colored tinting to provide a decorative display. In another example, known eyeglasses or sunglasses have provided a light source which illuminates a portion of the eyeglasses or sunglasses, such as the arms or bridge.

A need, therefore, exists for eyewear having an improved illuminated display wherein an edge of a lens of the eyewear may be illuminated to provide a decorative display.

SUMMARY OF THE INVENTION

The present invention relates to eyewear which may have a lens having an edge which is illuminated. The eyewear may have a bridge which may connect two arms. A light source may be associated with the bridge. The light source may transmit light through the lens of the eyewear. The light may be seen along an edge of the lens. By providing light along the edge of the lens, the eyewear may provide a decorative look.

To this end, in an embodiment of the present invention, illuminated eyewear is provided. The illuminated eyewear has a bridge having a length defined between a first end and a second end wherein the bridge has walls defining an interior. The illuminated eyewear also has a light source within the bridge. In addition, the illuminated eyewear has a lens having an edge defined by a perimeter of the lens wherein the lens is attached to the bridge and wherein the light source emits light into the lens wherein the light is directed to project from only along the edge of the lens.

In an embodiment, the illuminated eyewear has a power source connected to the light source.

In an embodiment, the illuminated eyewear has a switch connected to the light source wherein the switch controls activation of the light source.

In an embodiment, the illuminated eyewear has a second lens attached to the bridge wherein the light source projects light into the second lens.

In an embodiment, the light source is a bulb.

In an embodiment, the light source emits a non-white light.

In an embodiment, the illuminated eyewear has an arm attached to the bridge.

In another embodiment of the present invention, illuminated eyewear is provided. The illuminated eyewear has a bridge having a body defining an interior and further having a first end and a second end. The illuminated eyewear also has a power source attached to the bridge. A light source is provided within the interior of the bridge. The illuminated eyewear also has a lens having a peripheral edge wherein the lens is attached to the bridge wherein the light source is between the bridge and the lens and further wherein the lens projects light from the peripheral edge of the lens.

In an embodiment, the illuminated eyewear has an arm connected to the bridge.

In an embodiment, the illuminated eyewear has a switch connected to the light source wherein the switch controls an intensity of light emitted from the light source.

In an embodiment, the illuminated eyewear has a second lens attached to the bridge wherein the second lens emits light.

In an embodiment, the illuminated eyewear has a second light source within the bridge.

In an embodiment, the power source is a battery.

In an embodiment, the power source is a solar energy storing device.

In another embodiment of the present invention a method is provided for illuminating eyewear. The method has the steps of providing a bridge having a body defining an interior; placing a light source within the interior of the bridge; attaching a lens to the bridge wherein the light source is between the lens and the bridge and further wherein the lens has an edge defined by a perimeter of the lens; and emitting light into the lens wherein the light is projected along the edge of the lens.

In an embodiment, the method has the further step of connecting a power source to the light source.

In an embodiment, the method has the further step of connecting a switch to the light source.

In an embodiment, the method has the further step of controlling an amount of light projected along the edge.

In an embodiment, the method has the further step of attaching a second lens to the bridge.

In an embodiment, the method has the further step of inserting a second light source within the bridge.

It is, therefore, an advantage of the present invention to provide illuminated eyewear and a method for illuminating eyewear wherein light may be projected along an edge of a lens.

Another advantage of the present invention is to provide illuminated eyewear and a method for illuminating eyewear wherein an illuminated area of the eyewear provides a decorative display.

A still further advantage of the present invention is to provide illuminated eyewear and a method for illuminating eyewear wherein light of different colors may be projected along an edge of a lens of the eyewear.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to illuminated eyewear and a method for illuminating eyewear, such as, for example, a pair of sunglasses. In an embodiment, the eyewear may be a pair of glasses having clear lenses or lenses having a tint. The sunglasses may have a bridge. Connected to the bridge may be arms at either side of the bridge. One or more lenses may be connected to the bridge. Positioned between the lens(es) and the bridge may be a light source which may project light into the lens. The light may be projected along an edge of the lens. The light may provide an outline of a shape of the lens, and may also provide a decorative display.

Figure 1:
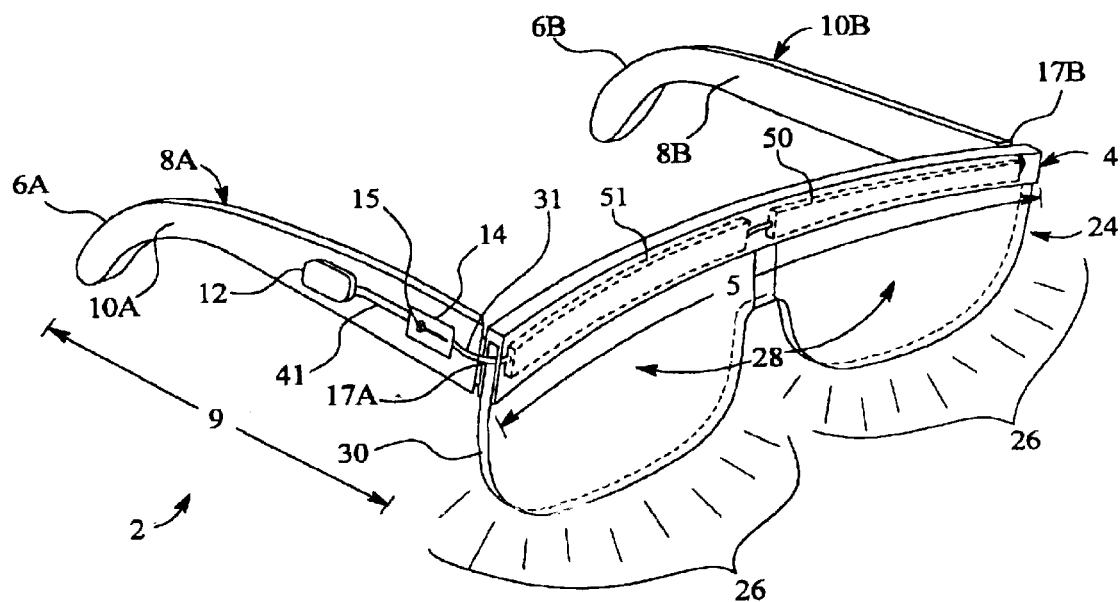
FIG. 1 illustrates a perspective view of eyewear in an embodiment of the present invention.

Referring now to the drawings wherein like numerals refer to like parts, FIG. 1 illustrates a form of eyewear 2 which may have a bridge 4. The eyewear 2 may be, for example, a pair of sunglasses. It should be understood, however, that any eyewear may be used, i.e., goggles, glasses, prescription glasses, sunglasses, clip-on type eyewear, or the like.

Connected to the bridge 4 may be arms 6A and 6B. The bridge 4 and the arms 6A and 6B may be constructed from, for example, plastic, metal, or other material. In an embodiment, the bridge 4 may be constructed from a material which is different from a material of the arms 6A, 6B. The bridge 4 may have a length 5 which may enable the arms 6A and 6B to contact opposite sides of, for example, a head of an individual. Moreover, as illustrated in FIG. 2, the bridge 4 may be generally C-shaped and may have a spacing 7 which may enable insertion of a light source 16 (described in further detail below) between walls 18 and 20.

The arms 6A, 6B may have a length 9 which may enable the arms 6A, 6B to contact, for example, above ears of the individual to secure the eyewear 2 to the individual, as glasses are customarily worn by the individual. The arms 6A, 6B may have an inner side 8A, 8B, respectively, which may be adjacent to, for example, the head of the individual when the eyewear 2 is worn. The arms 6A, 6B may also have an outer side 10A, 10B which may be opposite to the corresponding inner side 8A, 8B, respectively.

The arms 6A, 6B may attach to the bridge 4 at points 17A, 17B, respectively. To this end, in an embodiment, the arms 6A, 6B may be pivotally attached wherein, for example, arm 6A may be folded toward arm 6B, and vice versa. A fastening device (not shown) having a hinge may be attached to each of the arms 6A, 6B and to the bridge 4 to enable the arms 6A, 6B to pivot. In another embodiment, the arms 6A, 6B may be attached to the bridge 4 via an adhesive. In yet another embodiment, the arms 6A, 6B and the bridge 4 may be integrally formed.

Figure 2:
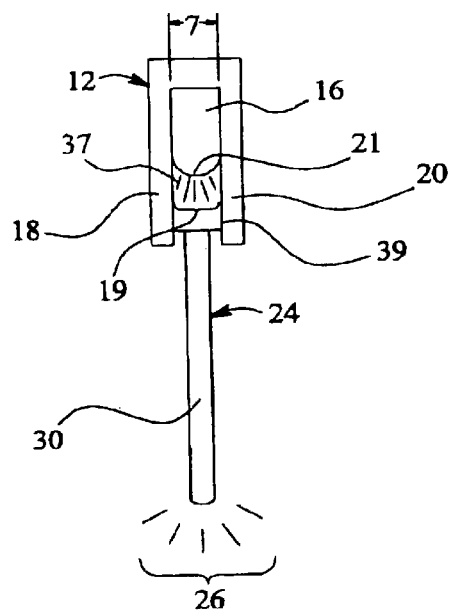
FIG. 2 illustrates a partial side view of a bridge and a lens of the eyewear of FIG. 1.

FIG. 2 illustrates a power source 12 attached to the outer side 10A of the arm 6A. However, in a preferred embodiment, the power source 12 may be located within the arm 6A. The power source 12 may be, for example, a battery, a solar-energy storing device, or other voltage-delivering device. In another embodiment, the power source 12 may be attached to one of the inner sides 8A, 8B via, for example, an adhesive, or other fastening means. FIG. 2 also illustrates a switch 14 attached to the outer side 10A of the arm 6A electrically connected to the power source 12 via a wire 41. However, in the preferred embodiment, the switch 14 may be contained within the arm 6A. The switch 14 may have a button 15 which may project out of the arm 6A. The switch 14 may be connected to the light source 16 via a wire 31 and may be activated to enable voltage to be delivered from the power source 12 to the light source 16. The wire 31 may be contained within the arm 6A and may enter the bridge 4 to connect to the light source 16 within the bridge. In an embodiment, the switch 14 may function as a potentiometer and may allow the individual to adjust an amount of voltage delivered to the light source 16. As a result, an intensity of light 26 projected along an edge 30 of a lens 24 may be varied.

FIG. 2 illustrates a side view of the bridge 4 and the lens 24 which may be secured to the bridge 4. The lens 24 may be constructed from glass, plastic, or like material. In an embodiment, the lens 24 may be tinted or may have a mirror-type coating. An amount of tinting of the lens 24 may depend on a function which the eyewear 2 is addressing (i.e. ultraviolet protection, reading aid, etc.). The lens 24 may be secured via, for example, an interference fit. In an embodiment, the lens 24 may be secured via an adhesive.

The light source 16 may be positioned between the bridge 4 and the lens 24. The light source 16 may be, for example, a bulb, a fluorescent light source, a light emitting diode, a neon light source, or other light emitting device. The light source 16 may have a filament (not shown) or other component which enables the light source 16 to create the light 19. The light source 16 may extend along the length 5 of the bridge 4. In an embodiment, the light source 16 may emit light 19. Walls 18, 20 of the bridge 4 may prevent the light 19 from being seen within the bridge 4. To this end, in an embodiment, the walls 18, 20 may have reflective material (not shown) along a surface 37, 39, respectively. As a result, the light 19 may be directed into the lens 24 through an end 21 of the light source 16. In keeping with laws of refraction, the light 19 may travel through the lens 24 without projection of the light 19 from a surface 28 of the lens 24. In an embodiment, a second light source 50 may be contained within the bridge 4. The second light source 50 may receive voltage from the power source 12 through a wire 51 wherein the light source 16 and the second light source 50 are connected in a series circuit. In an embodiment, the light source 16, or light sources 16, 50 may emit a colored light, such as a non-white color. Each of the light sources 16, 50 may emit a distinctly colored light 19. For example, if bulbs are implemented, the bulbs may have non-white casings which hold the filament. Moreover, in the case of any light source 16 incorporating a filament, a non-white casing for the filament may be contemplated. Moreover any number of light sources which may fit within the length 5 of the bridge 4 is contemplated. Each light source may be connected to the power source 12 via a series circuit connection.

To illuminate the eyewear 2, the individual may activate the switch 14. The power source 12 may then deliver an amount of voltage to the light source 16. Light 19 emitted from the light source 16 may be transmitted into the lens 24. Light 26 may then be projected outward through the edge 30 of the lens 24. Illumination of the edge 30 of the eyewear 2 may provide a decorative display to the eyewear 2. The individual, while wearing the eyewear 2, may be provided with an illuminated viewpoint as a result of the light 19 within the lens 24, in comparison to a viewpoint the individual may have when wearing the eyewear 2 without activation of the light source 16.

Moreover, in an embodiment, two lenses 24 may be attached to the bridge 4. Light 19 may be projected along each of the lenses 24 to provide a distinct design. In other embodiments, a shape of the lens 24 may be varied to provide distinct decorative outlines of light 26 projected along the edge 30 of the eyewear 2. For example, the lens 24 may have a rectangular shape, oval shape, or may be in a shape of an object, such as a car, animal, or the like. In another embodiment, the switch 14 may cause the light 19 emitted from the light source 16 to pulse. As a result, the light 26 projected along the edge 30 may pulse and may provide an additional decorative aspect to the eyewear 2.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. Illuminated eyewear comprising:
a bridge having a length defined between a first end and a second end wherein the bridge has walls defining an interior;
a light source within the bridge;
a lens having an edge defined by a perimeter of the lens wherein the lens is attached to the bridge and wherein the light source emits light into the lens wherein the light is directed to project from only along the edge of the lens.

2. The illuminated eyewear further comprising:
a power source connected to the light source.

3. The illuminated eyewear of claim 1 further comprising:
a switch connected to the light source wherein the switch controls activation of the light source.

4. The illuminated eyewear of claim 1 further comprising:
a second lens attached to the bridge wherein the light source projects light into the second lens.

5. The illuminated eyewear of claim 1 wherein the light source is a bulb.

6. The illuminated eyewear of claim 1 wherein the light source emits a non-white light.

7. The illuminated eyewear of claim 1 further comprising:
an arm attached to the bridge.

8. Illuminated eyewear comprising:
a bridge having a body defining an interior and further having a first end and a second end;
a power source attached to the bridge;
a light source within the interior of the bridge;
a lens having a peripheral edge wherein the lens is attached to the bridge wherein the light source is between the bridge and the lens and further wherein the lens projects light from the peripheral edge of the lens.

9. The illuminated eyewear of claim 8 further comprising:
an arm connected to the bridge.

10. The illuminated eyewear of claim 8 further comprising:
a switch connected to the light source wherein the switch controls an intensity of light emitted from the light source.

11. The illuminated eyewear of claim 8 further comprising:
a second lens attached to the bridge wherein the second lens emits light.

12. The illuminated eyewear of claim 8 further comprising:
a second light source within the bridge.

13. The illuminated eyewear of claim 8 wherein the power source is a battery.

14. The illuminated eyewear of claim 8 wherein the power source is a solar energy storing device.

15. A method for illuminating eyewear, the method comprising the steps of:
providing a bridge having a body defining an interior;
placing a light source within the interior of the bridge;
attaching a lens to the bridge wherein the light source is between the lens and the bridge and further wherein the lens has an edge defined by a perimeter of the lens; and
emitting light into the lens wherein the light is projected along the edge of the lens.

16. The method of claim 15 further comprising the step of:
connecting a power source to the light source.

17. The method of claim 15 further comprising the step of:
connecting a switch to the light source.

18. The method of claim 15 further comprising the step of:
controlling an amount of light projected along the edge.

19. The method of claim 15 further comprising the step of:
attaching a second lens to the bridge.

20. The method of claim 15 further comprising the step of:
inserting a second light source within the bridge.

* * * * *